United States Patent
Takayanagi

(10) Patent No.: US 6,398,441 B1
(45) Date of Patent: Jun. 4, 2002

(54) INK FOR BALL-POINT PEN AND BALL-POINT PEN USING THE SAME

(75) Inventor: Toshiaki Takayanagi, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/806,659
(22) PCT Filed: Sep. 30, 1999
(86) PCT No.: PCT/JP99/05391
§ 371 (c)(1),
(2), (4) Date: Mar. 30, 2001
(87) PCT Pub. No.: WO00/20522
PCT Pub. Date: Apr. 13, 2000

(30) Foreign Application Priority Data

Oct. 1, 1998 (JP) .......................... 10-280204

(51) Int. Cl.$^7$ ............................ B43K 7/06; B43K 5/00; B43K 5/12; C09D 11/18
(52) U.S. Cl. ..................................... 401/192; 106/31.32
(58) Field of Search ........................ 401/192; 106/31.32

(56) References Cited

U.S. PATENT DOCUMENTS

| | | | |
|---|---|---|---|
| 5,069,719 A | * 12/1991 | Ono | .................. 106/31.37 X |
| 5,547,499 A | 8/1996 | Kawasumi et al. | ........ 106/20 R |
| 5,600,443 A | * 2/1997 | Frey et al. | .................. 356/402 |
| 5,759,246 A | * 6/1998 | Frey et al. | ............... 106/31.32 |
| 6,037,391 A | 3/2000 | Iida | ........................... 523/161 |

FOREIGN PATENT DOCUMENTS

| | | |
|---|---|---|
| JP | 05271602 | 10/1993 |
| JP | 6009916 A | 1/1994 |
| JP | 10095947 | 4/1998 |
| JP | 10195367 | 7/1998 |
| JP | 11012526 | 1/1999 |

* cited by examiner

Primary Examiner—Gregory Huson
Assistant Examiner—Kathleen J. Prunner
(74) Attorney, Agent, or Firm—Darby & Darby

(57) ABSTRACT

An oil based red ink for a ball point pen comprising at least one organic solvent selected from the group consisting of alcohols and glycol ethers, a resin and a colorant, wherein the spectral reflectance determined in the state where the ink for a ball point pen described above is filled into an ink reservoir is 20% or more at least in a longer wavelength area than 620 nm; and a spectral reflectance-rapid increase area which is the area where a difference between a spectral reflectance in the area and an average spectral reflectance in 400 to 560 nm is plus 4% or more is present between 580 to 600 nm. A color of this ink can be identified from the appearance through a barrel of the ball point pen, and the color thereof is close to the drawn line color obtained in writing.

10 Claims, 13 Drawing Sheets

Spectral Reflectance through Polypropylene Tube

| Wavelength (nm) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| 800 | 59.684 | 71.711 | 58.167 | 49.193 | 48.509 | 46.492 | 36.539 | 16.983 | 4.922 |
| 798 | 59.674 | 71.770 | 58.127 | 48.998 | 48.411 | 46.401 | 36.568 | 16.988 | 4.908 |
| 796 | 59.661 | 71.764 | 58.068 | 48.716 | 48.245 | 46.300 | 36.583 | 16.987 | 4.889 |
| 794 | 59.644 | 71.788 | 57.970 | 48.392 | 48.023 | 46.205 | 36.599 | 16.999 | 4.869 |
| 792 | 59.623 | 71.784 | 57.912 | 48.085 | 47.814 | 46.133 | 36.632 | 17.005 | 4.848 |
| 790 | 59.593 | 71.700 | 57.896 | 47.875 | 47.612 | 46.074 | 36.705 | 17.004 | 4.823 |
| 788 | 59.541 | 71.596 | 57.871 | 47.751 | 47.463 | 46.027 | 36.789 | 16.996 | 4.803 |
| 786 | 59.497 | 71.448 | 57.847 | 47.713 | 47.362 | 46.014 | 36.848 | 16.973 | 4.787 |
| 784 | 59.434 | 71.347 | 57.831 | 47.734 | 47.316 | 45.978 | 36.175 | 16.963 | 4.773 |
| 782 | 59.331 | 71.282 | 57.756 | 47.689 | 47.270 | 45.906 | 36.966 | 16.971 | 4.746 |
| 780 | 59.250 | 71.313 | 57.660 | 47.676 | 47.248 | 45.873 | 37.033 | 16.988 | 4.727 |
| 778 | 59.248 | 71.224 | 57.591 | 47.698 | 47.230 | 45.872 | 37.066 | 17.016 | 4.714 |
| 776 | 59.211 | 71.162 | 57.512 | 47.704 | 47.228 | 45.934 | 37.108 | 17.037 | 4.706 |
| 774 | 59.220 | 71.125 | 57.383 | 47.686 | 47.216 | 45.963 | 37.151 | 17.049 | 4.692 |
| 772 | 59.171 | 71.082 | 57.266 | 47.689 | 47.219 | 45.970 | 37.204 | 17.058 | 4.670 |
| 770 | 59.072 | 71.025 | 57.145 | 47.658 | 47.192 | 45.953 | 37.285 | 17.044 | 4.647 |
| 768 | 58.966 | 70.864 | 57.028 | 47.617 | 47.160 | 45.940 | 37.346 | 17.029 | 4.626 |
| 766 | 58.811 | 70.757 | 56.844 | 47.494 | 47.042 | 45.888 | 37.371 | 17.005 | 4.602 |
| 764 | 58.642 | 70.719 | 56.688 | 47.310 | 46.906 | 45.804 | 37.351 | 16.974 | 4.583 |
| 762 | 58.514 | 70.646 | 56.590 | 47.129 | 46.730 | 45.709 | 37.375 | 16.958 | 4.561 |

Fig. 2A

| | | | | | | | |
|---|---|---|---|---|---|---|---|
| 760 | 58.393 | 70.626 | 56.491 | 46.912 | 46.537 | 45.581 | 37.391 | 16.958 | 4.535 |
| 758 | 58.340 | 70.552 | 56.404 | 46.691 | 46.316 | 45.471 | 37.398 | 16.951 | 4.514 |
| 756 | 58.225 | 70.517 | 56.327 | 46.422 | 46.078 | 45.291 | 37.402 | 16.945 | 4.490 |
| 754 | 58.131 | 70.432 | 56.226 | 46.063 | 45.806 | 45.079 | 37.400 | 16.938 | 4.464 |
| 752 | 57.992 | 70.342 | 56.074 | 45.700 | 45.535 | 44.827 | 37.387 | 16.924 | 4.446 |
| 750 | 57.905 | 70.215 | 55.934 | 45.395 | 45.206 | 44.584 | 37.355 | 16.933 | 4.433 |
| 748 | 57.778 | 70.074 | 55.749 | 45.040 | 44.865 | 44.310 | 37.325 | 16.943 | 4.413 |
| 746 | 57.686 | 69.924 | 55.576 | 44.732 | 44.526 | 44.071 | 37.281 | 16.980 | 4.403 |
| 744 | 57.574 | 69.873 | 55.413 | 44.411 | 44.192 | 43.827 | 37.241 | 16.997 | 4.397 |
| 742 | 57.432 | 69.815 | 55.261 | 44.079 | 43.837 | 43.598 | 37.227 | 16.996 | 4.382 |
| 740 | 57.329 | 69.773 | 55.154 | 43.813 | 43.550 | 43.403 | 37.220 | 17.017 | 4.365 |
| 738 | 57.211 | 69.722 | 55.027 | 43.544 | 43.293 | 43.205 | 37.205 | 17.035 | 4.348 |
| 736 | 57.065 | 69.698 | 54.936 | 43.301 | 43.080 | 43.019 | 37.180 | 17.049 | 4.338 |
| 734 | 56.920 | 69.624 | 54.812 | 43.114 | 42.922 | 42.863 | 37.176 | 17.028 | 4.339 |
| 732 | 56.751 | 69.585 | 54.644 | 42.933 | 42.814 | 42.735 | 37.190 | 17.029 | 4.333 |
| 730 | 56.589 | 69.514 | 54.416 | 42.927 | 42.727 | 42.635 | 37.229 | 17.028 | 4.336 |

Fig. 2B

| | | | | | | |
|---|---|---|---|---|---|---|
| 728 | 56.339 | 69.471 | 54.181 | 42.886 | 42.624 | 42.539 | 37.258 | 17.043 | 4.333 |
| 726 | 56.136 | 69.388 | 53.987 | 42.899 | 42.566 | 42.492 | 37.308 | 17.056 | 4.336 |
| 724 | 55.911 | 69.269 | 53.760 | 42.934 | 42.543 | 42.470 | 37.346 | 17.048 | 4.343 |
| 722 | 55.679 | 69.158 | 53.539 | 42.991 | 42.507 | 42.501 | 37.391 | 17.031 | 4.348 |
| 720 | 55.454 | 69.037 | 53.302 | 43.044 | 42.493 | 42.495 | 37.441 | 16.997 | 4.341 |
| 718 | 55.237 | 68.947 | 53.072 | 43.153 | 42.515 | 42.511 | 37.468 | 16.968 | 4.342 |
| 716 | 55.038 | 68.930 | 52.856 | 43.246 | 42.539 | 42.495 | 37.473 | 16.936 | 4.343 |
| 714 | 54.853 | 68.905 | 52.674 | 43.341 | 42.564 | 42.498 | 37.457 | 16.906 | 4.345 |
| 712 | 54.676 | 68.883 | 52.500 | 43.423 | 42.555 | 42.463 | 37.457 | 16.874 | 4.345 |
| 710 | 54.543 | 68.847 | 52.339 | 43.489 | 42.529 | 42.389 | 37.438 | 16.855 | 4.345 |
| 708 | 54.404 | 68.779 | 52.240 | 43.492 | 42.473 | 42.293 | 37.420 | 16.863 | 4.344 |
| 706 | 54.308 | 68.656 | 52.142 | 43.483 | 42.405 | 42.174 | 37.387 | 16.839 | 4.347 |
| 704 | 54.247 | 68.494 | 52.052 | 43.495 | 42.326 | 42.085 | 37.367 | 16.831 | 4.345 |
| 702 | 54.189 | 68.287 | 51.929 | 43.450 | 42.221 | 41.982 | 37.342 | 16.813 | 4.354 |
| 700 | 54.105 | 68.142 | 51.780 | 43.395 | 42.106 | 41.868 | 37.313 | 16.796 | 4.355 |

Fig. 2C

| Wavelength (nm) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| 698 | 54.022 | 67.994 | 51.674 | 43.333 | 41.979 | 41.731 | 37.267 | 16.773 | 4.354 |
| 696 | 53.950 | 67.828 | 51.572 | 43.280 | 41.863 | 41.619 | 37.207 | 16.758 | 4.349 |
| 694 | 53.862 | 67.694 | 51.481 | 43.204 | 41.753 | 41.500 | 37.150 | 16.754 | 4.349 |
| 692 | 53.793 | 67.504 | 51.394 | 43.116 | 41.662 | 41.372 | 37.102 | 16.750 | 4.348 |
| 690 | 53.702 | 67.329 | 51.293 | 43.037 | 41.571 | 41.270 | 37.066 | 16.728 | 4.353 |
| 688 | 53.574 | 67.154 | 51.140 | 42.931 | 41.441 | 41.128 | 37.008 | 16.704 | 4.355 |
| 686 | 53.429 | 66.980 | 50.984 | 42.822 | 41.313 | 40.995 | 36.911 | 16.684 | 4.357 |
| 684 | 53.289 | 66.796 | 50.800 | 42.705 | 41.182 | 40.846 | 36.847 | 16.649 | 4.363 |
| 682 | 53.139 | 66.621 | 50.614 | 42.577 | 41.035 | 40.691 | 36.758 | 16.606 | 4.370 |
| 680 | 52.955 | 66.408 | 50.430 | 42.406 | 40.864 | 40.515 | 36.648 | 16.560 | 4.374 |
| 678 | 52.789 | 66.187 | 50.225 | 42.218 | 40.706 | 40.307 | 36.535 | 16.504 | 4.373 |
| 676 | 52.635 | 65.954 | 50.022 | 42.063 | 40.555 | 40.103 | 36.391 | 16.452 | 4.366 |
| 674 | 52.434 | 65.677 | 49.824 | 41.874 | 40.393 | 39.875 | 36.252 | 16.395 | 4.368 |
| 672 | 52.264 | 65.424 | 49.620 | 41.682 | 40.221 | 39.632 | 36.085 | 16.324 | 4.376 |
| 670 | 52.109 | 65.163 | 49.408 | 41.498 | 40.022 | 39.390 | 35.876 | 16.244 | 4.380 |
| 668 | 51.962 | 64.875 | 49.213 | 41.328 | 39.824 | 39.175 | 35.649 | 16.164 | 4.385 |
| 666 | 51.797 | 64.620 | 48.992 | 41.169 | 39.586 | 38.917 | 35.388 | 16.073 | 4.394 |
| 664 | 51.665 | 64.306 | 48.801 | 41.015 | 39.375 | 38.661 | 35.104 | 15.969 | 4.402 |

Fig. 3A

| | | | | | | |
|---|---|---|---|---|---|---|
| 662 | 51.536 | 63.996 | 48.588 | 40.873 | 39.176 | 38.406 | 34.788 | 15.840 | 4.408 |
| 660 | 51.391 | 63.619 | 48.324 | 40.743 | 38.979 | 38.143 | 34.431 | 15.692 | 4.406 |
| 658 | 51.252 | 63.199 | 48.033 | 40.638 | 38.809 | 37.874 | 34.015 | 15.521 | 4.402 |
| 656 | 51.116 | 62.732 | 47.713 | 40.552 | 38.666 | 37.583 | 33.572 | 15.315 | 4.402 |
| 654 | 50.960 | 62.227 | 47.358 | 40.460 | 38.509 | 37.277 | 33.073 | 15.079 | 4.407 |
| 652 | 50.808 | 61.642 | 46.998 | 40.395 | 38.342 | 36.976 | 32.533 | 14.814 | 4.414 |
| 650 | 50.660 | 61.010 | 46.577 | 40.348 | 38.181 | 36.666 | 31.939 | 14.507 | 4.420 |
| 648 | 50.509 | 60.331 | 46.099 | 40.330 | 38.016 | 36.329 | 31.237 | 14.168 | 4.424 |
| 646 | 50.294 | 59.579 | 45.548 | 40.306 | 37.839 | 35.927 | 30.493 | 13.785 | 4.429 |
| 644 | 50.068 | 58.762 | 44.935 | 40.257 | 37.622 | 35.492 | 29.658 | 13.345 | 4.434 |
| 642 | 49.785 | 57.844 | 44.208 | 40.196 | 37.352 | 34.996 | 28.716 | 12.856 | 4.433 |
| 640 | 49.489 | 56.832 | 43.392 | 40.115 | 37.048 | 34.447 | 27.702 | 12.306 | 4.438 |
| 638 | 49.134 | 55.716 | 42.468 | 40.001 | 36.673 | 33.825 | 26.601 | 11.705 | 4.441 |
| 636 | 48.713 | 54.450 | 41.463 | 39.835 | 36.226 | 33.117 | 25.423 | 11.055 | 4.450 |
| 634 | 48.190 | 53.082 | 40.341 | 39.582 | 35.671 | 32.307 | 24.177 | 10.359 | 4.464 |
| 632 | 47.568 | 51.592 | 39.108 | 39.257 | 35.032 | 31.410 | 22.878 | 9.637 | 4.466 |
| 630 | 46.859 | 49.974 | 37.739 | 38.847 | 34.301 | 30.408 | 21.524 | 8.899 | 4.470 |
| 628 | 46.018 | 48.252 | 36.220 | 38.327 | 33.472 | 29.293 | 20.135 | 8.173 | 4.469 |

Fig. 3B

| | | | | | | |
|---|---|---|---|---|---|---|
| 626 | 45.082 | 46.448 | 34.577 | 37.708 | 32.526 | 28.080 | 18.738 | 7.481 | 4.470 |
| 624 | 44.038 | 44.548 | 32.830 | 36.993 | 31.484 | 26.799 | 17.369 | 6.866 | 4.474 |
| 622 | 42.929 | 42.585 | 30.980 | 36.195 | 30.353 | 25.469 | 16.035 | 6.338 | 4.480 |
| 620 | 41.721 | 40.540 | 29.035 | 35.299 | 29.136 | 24.087 | 14.742 | 5.910 | 4.491 |
| 618 | 40.438 | 38.436 | 27.017 | 34.324 | 27.843 | 22.661 | 13.526 | 5.585 | 4.503 |
| 616 | 39.099 | 36.309 | 24.989 | 33.255 | 26.506 | 21.244 | 12.393 | 5.349 | 4.511 |
| 614 | 37.674 | 34.146 | 22.958 | 32.113 | 25.124 | 19.823 | 11.352 | 5.188 | 4.521 |
| 612 | 36.249 | 32.015 | 20.992 | 30.920 | 23.738 | 18.451 | 10.419 | 5.083 | 4.530 |
| 610 | 34.720 | 29.879 | 19.091 | 29.604 | 22.322 | 17.105 | 9.578 | 5.013 | 4.532 |
| 608 | 33.084 | 27.721 | 17.277 | 28.213 | 20.889 | 15.786 | 8.834 | 4.973 | 4.538 |
| 606 | 31.329 | 25.602 | 15.591 | 26.729 | 19.457 | 14.529 | 8.189 | 4.954 | 4.550 |
| 604 | 29.445 | 23.530 | 14.071 | 25.171 | 18.050 | 13.343 | 7.638 | 4.939 | 4.553 |
| 602 | 27.432 | 21.487 | 12.729 | 23.536 | 16.670 | 12.236 | 7.164 | 4.929 | 4.567 |
| 600 | 25.254 | 19.479 | 11.562 | 21.809 | 15.323 | 11.208 | 6.769 | 4.923 | 4.579 |

Fig. 3C

| Wavelength (nm) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| 598 | 22.949 | 17.536 | 10.601 | 20.024 | 14.017 | 10.269 | 6.445 | 4.924 | 4.592 |
| 596 | 20.512 | 15.684 | 9.823 | 18.168 | 12.768 | 9.433 | 6.184 | 4.919 | 4.608 |
| 594 | 18.020 | 13.960 | 9.207 | 16.249 | 11.577 | 8.700 | 5.972 | 4.918 | 4.617 |
| 592 | 15.508 | 12.377 | 8.704 | 14.291 | 10.439 | 8.037 | 5.800 | 4.914 | 4.630 |
| 590 | 13.095 | 10.940 | 8.272 | 12.354 | 9.343 | 7.435 | 5.647 | 4.917 | 4.645 |
| 588 | 10.898 | 9.684 | 7.892 | 10.511 | 8.329 | 6.895 | 5.514 | 4.926 | 4.658 |
| 586 | 9.003 | 8.606 | 7.539 | 8.874 | 7.429 | 6.395 | 5.393 | 4.934 | 4.681 |
| 584 | 7.572 | 7.757 | 7.259 | 7.554 | 6.698 | 6.004 | 5.297 | 4.942 | 4.702 |
| 582 | 6.558 | 7.101 | 7.034 | 6.530 | 6.138 | 5.695 | 5.221 | 4.953 | 4.719 |
| 580 | 5.925 | 6.592 | 6.875 | 5.844 | 5.746 | 5.471 | 5.172 | 4.960 | 4.734 |
| 578 | 5.577 | 6.236 | 6.782 | 5.427 | 5.508 | 5.332 | 5.147 | 4.971 | 4.753 |
| 576 | 5.410 | 5.989 | 6.733 | 5.210 | 5.390 | 5.256 | 5.139 | 4.973 | 4.763 |
| 574 | 5.346 | 5.845 | 6.722 | 5.115 | 5.353 | 5.227 | 5.141 | 4.972 | 4.770 |
| 572 | 5.296 | 5.756 | 6.721 | 5.065 | 5.352 | 5.226 | 5.156 | 4.976 | 4.773 |
| 570 | 5.240 | 5.705 | 6.720 | 5.026 | 5.356 | 5.226 | 5.172 | 4.987 | 4.770 |
| 568 | 5.181 | 5.669 | 6.706 | 4.983 | 5.365 | 5.234 | 5.191 | 4.996 | 4.768 |
| 566 | 5.124 | 5.639 | 6.679 | 4.947 | 5.379 | 5.243 | 5.210 | 5.011 | 4.749 |
| 564 | 5.070 | 5.608 | 6.648 | 4.921 | 5.398 | 5.248 | 5.224 | 5.019 | 4.726 |

Fig. 4A

| | | | | | | | |
|---|---|---|---|---|---|---|---|
| 562 | 5.025 | 5.558 | 6.608 | 4.907 | 5.413 | 5.253 | 5.237 | 5.030 | 4.698 |
| 560 | 4.982 | 5.489 | 6.560 | 4.907 | 5.424 | 5.258 | 5.254 | 5.037 | 4.655 |
| 558 | 4.943 | 5.419 | 6.510 | 4.915 | 5.438 | 5.252 | 5.272 | 5.041 | 4.612 |
| 556 | 4.899 | 5.349 | 6.451 | 4.925 | 5.445 | 5.243 | 5.280 | 5.039 | 4.562 |
| 554 | 4.862 | 5.284 | 6.387 | 4.934 | 5.452 | 5.235 | 5.283 | 5.041 | 4.515 |
| 552 | 4.830 | 5.225 | 6.325 | 4.944 | 5.458 | 5.228 | 5.288 | 5.040 | 4.466 |
| 550 | 4.800 | 5.176 | 6.256 | 4.953 | 5.460 | 5.221 | 5.292 | 5.036 | 4.422 |
| 548 | 4.765 | 5.134 | 6.192 | 4.961 | 5.458 | 5.206 | 5.289 | 5.032 | 4.380 |
| 546 | 4.740 | 5.102 | 6.127 | 4.964 | 5.454 | 5.190 | 5.280 | 5.021 | 4.346 |
| 544 | 4.712 | 5.077 | 6.069 | 4.969 | 5.445 | 5.173 | 5.266 | 5.008 | 4.316 |
| 542 | 4.683 | 5.054 | 6.018 | 4.972 | 5.429 | 5.151 | 5.253 | 4.994 | 4.288 |
| 540 | 4.656 | 5.039 | 5.963 | 4.968 | 5.408 | 5.125 | 5.234 | 4.973 | 4.263 |
| 538 | 4.634 | 5.029 | 5.914 | 4.963 | 5.387 | 5.096 | 5.211 | 4.949 | 4.232 |
| 536 | 4.616 | 5.023 | 5.879 | 4.953 | 5.366 | 5.066 | 5.183 | 4.922 | 4.206 |
| 534 | 4.612 | 5.018 | 5.848 | 4.942 | 5.344 | 5.036 | 5.152 | 4.900 | 4.181 |
| 532 | 4.611 | 5.017 | 5.829 | 4.930 | 5.319 | 5.012 | 5.122 | 4.879 | 4.154 |
| 530 | 4.621 | 5.019 | 5.814 | 4.919 | 5.296 | 4.990 | 5.098 | 4.857 | 4.131 |
| 528 | 4.636 | 5.025 | 5.804 | 4.904 | 5.274 | 4.969 | 5.074 | 4.837 | 4.113 |

Fig. 4B

| | | | | | | |
|---|---|---|---|---|---|---|
| 526 | 4.652 | 5.038 | 5.788 | 4.889 | 5.255 | 4.954 | 5.051 | 4.819 | 4.102 |
| 524 | 4.669 | 5.049 | 5.770 | 4.877 | 5.238 | 4.943 | 5.032 | 4.801 | 4.093 |
| 522 | 4.681 | 5.055 | 5.745 | 4.868 | 5.224 | 4.931 | 5.017 | 4.785 | 4.084 |
| 520 | 4.688 | 5.057 | 5.718 | 4.860 | 5.211 | 4.920 | 5.003 | 4.774 | 4.074 |
| 518 | 4.691 | 5.057 | 5.676 | 4.852 | 5.201 | 4.910 | 4.992 | 4.767 | 4.068 |
| 516 | 4.693 | 5.052 | 5.633 | 4.846 | 5.192 | 4.900 | 4.984 | 4.762 | 4.060 |
| 514 | 4.695 | 5.039 | 5.586 | 4.845 | 5.185 | 4.896 | 4.981 | 4.765 | 4.057 |
| 512 | 4.697 | 5.023 | 5.530 | 4.837 | 5.174 | 4.890 | 4.980 | 4.768 | 4.057 |
| 510 | 4.696 | 5.006 | 5.476 | 4.827 | 5.162 | 4.883 | 4.979 | 4.770 | 4.053 |
| 508 | 4.697 | 4.986 | 5.419 | 4.815 | 5.155 | 4.876 | 4.978 | 4.772 | 4.055 |
| 506 | 4.697 | 4.967 | 5.361 | 4.801 | 5.147 | 4.864 | 4.974 | 4.777 | 4.059 |
| 504 | 4.693 | 4.951 | 5.303 | 4.788 | 5.143 | 4.852 | 4.967 | 4.785 | 4.056 |
| 502 | 4.686 | 4.940 | 5.247 | 4.775 | 5.139 | 4.840 | 4.956 | 4.783 | 4.053 |
| 500 | 4.674 | 4.926 | 5.194 | 4.759 | 5.131 | 4.820 | 4.947 | 4.782 | 4.052 |

Fig. 4C

| Wavelength (nm) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| 498 | 4.665 | 4.913 | 5.147 | 4.744 | 5.122 | 4.807 | 4.937 | 4.785 | 4.053 |
| 496 | 4.657 | 4.901 | 5.104 | 4.729 | 5.112 | 4.795 | 4.924 | 4.785 | 4.056 |
| 494 | 4.657 | 4.884 | 5.068 | 4.711 | 5.096 | 4.788 | 4.918 | 4.786 | 4.058 |
| 492 | 4.660 | 4.868 | 5.039 | 4.696 | 5.079 | 4.788 | 4.913 | 4.787 | 4.060 |
| 490 | 4.655 | 4.851 | 5.006 | 4.679 | 5.061 | 4.784 | 4.912 | 4.788 | 4.066 |
| 488 | 4.654 | 4.835 | 4.979 | 4.659 | 5.048 | 4.777 | 4.906 | 4.790 | 4.066 |
| 486 | 4.653 | 4.823 | 4.949 | 4.644 | 5.040 | 4.772 | 4.899 | 4.795 | 4.072 |
| 484 | 4.652 | 4.812 | 4.919 | 4.634 | 5.036 | 4.770 | 4.892 | 4.797 | 4.076 |
| 482 | 4.645 | 4.804 | 4.894 | 4.624 | 5.029 | 4.764 | 4.886 | 4.797 | 4.073 |
| 480 | 4.641 | 4.789 | 4.867 | 4.616 | 5.026 | 4.761 | 4.883 | 4.796 | 4.076 |
| 478 | 6.645 | 4.775 | 4.845 | 4.610 | 5.023 | 4.758 | 4.879 | 4.798 | 4.080 |
| 476 | 6.452 | 4.759 | 4.828 | 4.607 | 5.021 | 4.757 | 4.874 | 4.809 | 4.086 |
| 474 | 4.662 | 4.747 | 4.810 | 4.602 | 5.018 | 4.762 | 4.870 | 4.813 | 4.095 |
| 472 | 4.669 | 4.733 | 4.791 | 4.595 | 5.015 | 4.762 | 4.874 | 4.818 | 4.104 |
| 470 | 4.675 | 4.715 | 4.775 | 4.595 | 5.010 | 4.764 | 4.876 | 4.830 | 4.120 |
| 468 | 4.672 | 4.707 | 4.761 | 4.592 | 5.006 | 4.762 | 4.874 | 4.831 | 4.133 |
| 466 | 4.670 | 4.696 | 4.745 | 4.584 | 5.001 | 4.761 | 4.874 | 4.835 | 4.138 |
| 464 | 4.671 | 4.689 | 4.729 | 4.580 | 5.003 | 4.765 | 4.871 | 4.839 | 4.145 |

Fig. 5A

| | | | | | | |
|---|---|---|---|---|---|---|
| 462 | 4.670 | 4.681 | 4.713 | 4.578 | 4.999 | 4.762 | 4.876 | 4.838 | 4.150 |
| 460 | 4.670 | 4.671 | 4.698 | 4.573 | 4.997 | 4.761 | 4.877 | 4.832 | 4.152 |
| 458 | 4.669 | 4.661 | 4.693 | 4.567 | 4.996 | 4.755 | 4.879 | 4.831 | 4.159 |
| 456 | 4.670 | 4.650 | 4.687 | 4.564 | 4.995 | 4.756 | 4.876 | 4.831 | 4.163 |
| 454 | 4.667 | 4.644 | 4.686 | 4.562 | 4.996 | 4.758 | 4.878 | 4.833 | 4.168 |
| 452 | 4.660 | 4.634 | 4.680 | 4.565 | 5.001 | 4.762 | 4.874 | 4.836 | 4.175 |
| 450 | 4.660 | 4.630 | 4.682 | 4.567 | 5.010 | 4.766 | 4.874 | 4.840 | 4.180 |
| 448 | 4.657 | 4.624 | 4.690 | 4.569 | 5.019 | 4.779 | 4.875 | 4.850 | 4.186 |
| 446 | 4.652 | 4.626 | 4.701 | 4.570 | 5.028 | 4.787 | 4.881 | 4.852 | 4.191 |
| 444 | 4.649 | 4.626 | 4.712 | 4.566 | 5.032 | 4.791 | 4.886 | 4.862 | 4.198 |
| 442 | 4.643 | 4.627 | 4.728 | 4.565 | 5.039 | 4.797 | 4.904 | 4.876 | 4.211 |
| 440 | 4.633 | 4.629 | 4.747 | 4.567 | 5.037 | 4.801 | 4.918 | 4.879 | 4.217 |
| 438 | 4.624 | 4.624 | 4.775 | 4.567 | 5.031 | 4.801 | 4.933 | 4.885 | 4.216 |
| 436 | 4.625 | 4.622 | 4.800 | 4.570 | 5.027 | 4.803 | 4.938 | 4.892 | 4.221 |
| 434 | 4.628 | 4.619 | 4.823 | 4.573 | 5.029 | 4.807 | 4.944 | 4.897 | 4.220 |
| 432 | 4.633 | 4.622 | 4.850 | 4.578 | 5.040 | 4.818 | 4.943 | 4.897 | 4.221 |
| 430 | 4.639 | 4.622 | 4.887 | 4.579 | 5.059 | 4.818 | 4.942 | 4.906 | 4.225 |
| 428 | 4.641 | 4.624 | 4.921 | 4.575 | 5.071 | 4.831 | 4.941 | 4.918 | 4.227 |

| | | | | | | | |
|---|---|---|---|---|---|---|---|
| 426 | 4.640 | 4.628 | 4.958 | 4.572 | 5.089 | 4.839 | 4.952 | 4.928 |
| 424 | 4.638 | 4.628 | 4.984 | 4.576 | 5.105 | 4.849 | 4.960 | 4.936 |
| 422 | 4.631 | 4.635 | 5.013 | 4.575 | 5.112 | 4.855 | 4.972 | 4.941 |
| 420 | 4.626 | 4.634 | 5.044 | 4.582 | 5.117 | 4.874 | 4.984 | 4.954 |
| 418 | 4.622 | 4.640 | 5.072 | 4.589 | 5.119 | 4.886 | 4.990 | 4.957 |
| 416 | 4.628 | 4.646 | 5.095 | 4.595 | 5.118 | 4.898 | 4.988 | 4.963 |
| 414 | 4.627 | 4.651 | 5.127 | 4.594 | 5.124 | 4.904 | 4.995 | 4.971 |
| 412 | 4.625 | 4.656 | 5.162 | 4.596 | 5.137 | 4.971 | 5.001 | 4.979 |
| 410 | 4.625 | 4.658 | 5.215 | 4.600 | 5.154 | 4.936 | 5.015 | 4.993 |
| 408 | 4.633 | 4.657 | 5.273 | 4.607 | 5.166 | 4.957 | 5.028 | 5.014 |
| 406 | 4.641 | 4.656 | 5.331 | 4.618 | 5.179 | 4.979 | 5.044 | 5.034 |
| 404 | 4.649 | 4.656 | 5.388 | 4.630 | 5.189 | 5.003 | 5.057 | 5.049 |
| 402 | 4.658 | 4.656 | 5.436 | 4.640 | 5.195 | 5.013 | 5.065 | 5.066 |
| 400 | 4.663 | 4.659 | 5.469 | 4.648 | 5.191 | 5.025 | 5.066 | 5.080 |

| | |
|---|---|
| 4.228 | |
| 4.234 | |
| 4.240 | |
| 4.254 | |
| 4.271 | |
| 4.292 | |
| 4.308 | |
| 4.320 | |
| 4.327 | |
| 4.336 | |
| 4.341 | |
| 4.347 | |
| 4.357 | |
| 4.368 | |

INK FOR BALL-POINT PEN AND BALL-POINT PEN USING THE SAME

TECHNICAL FIELD

The present invention relates to an oil based red ink for a ball point pen and a ball point pen itself. More specifically, it relates to an oil based red ink for a ball point pen, the color of which can be observed from the outside when it is filled into a transparent or translucent ink reservoir and the visual color of which is close to that of the drawn lines, and a ball point pen using the same.

BACKGROUND ART

In conventional oil base red inks for a ball point pen, the visual color in the state where the ink is filled into an ink reservoir is different to a large extent from a color of the drawn lines. The visual color thereof is almost close to a black color in many cases, and it has been impossible to identify what color ink is filled into an ink reservoir from the outside of the ink reservoir. Accordingly, in such case, the ink reservoir has been colored to a red color to thereby make it possible to find that a red ink is filled thereinto.

Further, even in the case where it can be found from the appearance of an ink reservoir that a red ink is filled thereinto, there has been such a big difference in a color that while the visual color is dark red, drawn lines obtained in writing have a vivid red color.

The present invention has been made in light of the problems described above, and an object thereof is to provide an oil based red ink for a ball point pen, the visual color of which can be identified through an uncolored and transparent or translucent ink reservoir and a barrel of a ball point pen which transmits light and the color of which is close to a color of the drawn lines obtained in writing, and a ball point pen using the same.

DISCLOSURE OF THE INVENTION

Intensive researches repeated by-the present inventors in order to solve the problems described above have resulted in finding that use of an ink in which a spectral reflectance (%) determined in the state where the ink is filled into an ink reservoir is 20% or more at least in a longer wavelength area than 620 nm and in which a spectral reflectance-rapid increase area which is the area where a difference between a spectral reflectance in the area and an average spectral reflectance in 400 to 560 nm is plus 4% or more is present between 580 to 600 nm solves the conventional problems described above and makes it possible to identify a color of the ink by visual observation through the transparent ink reservoir and the transparent barrel of the ball point pen. Thus, the present invention has hen completed.

That is, the oil based red ink for a ball point pen of the present invention comprises at least one organic solvent selected from the group consisting of alcohols and glycol ethers, a resin and a colorant, wherein a spectral reflectance (%) determined in a state where the above ink for a ball point pen is filled into an ink reservoir is 20% or more at least in a longer wavelength area than 620 nm; and a spectral reflectance-rapid increase area which is the area where a difference between a spectral reflectance in the area and an average spectral reflectance in 400 to 560 nm is plus 4% or more is present between 580 to 600 nm.

The ball point pen of the present invention is characterized by charging an ink reservoir with the oil based red ink for a ball point pen described above.

"The spectral reflectance (%) is 20% or more at least in a longer wavelength area than 620 nm" in the present invention means that a measured value of the spectral reflectance determined in the state where the ink for a ball point pen of the present invention is filled into an ink reservoir is 20% or more at least in a longer wavelength area than 620 nm. Accordingly, it also includes an ink having a spectral reflectance of 20% or more in a shorter wavelength area than 620 nm (for example, 600 nm), which is determined in the state where the ink for a ball point pen of the present invention is filled into an ink reservoir.

Further, "a spectral reflectance-rapid increase area which is the area where a difference between a spectral reflectance in the area and-an average spectral reflectance in 400 to 560 nm is plus 4% or more is present between 580 to 600 nm" in the present invention means that the ink for a ball point pen of the present invention has a spectral reflectance-rapid increase area in 580 to 600 nm in the state where the above ink is filled into an ink reservoir and that-a value obtained by deducting an average value of a measured value of the spectral reflectance in 400 to 560 nm from a measured value of the spectral reflectance at any wavelength falling in a range of 580 to 600 nm corresponds to plus 4% or more.

BRIEF DESCRIPTION OF THE DRAWINGS

FIGS. 2A, 2B and 2C, when joined at match lines A—A and B—B are measured values of the spectral reflectances of the inks filled into a translucent tube in 800 to 700 nm;

FIGS. 3A, 3B and 3C, when joined at match lines A—A and B—B are measured values of the spectral reflectances of the inks filled into a translucent tube in 698 to 600 nm;

FIGS. 4A, 4B and 4C, when joined at match lines A—A and B—B are measured values of the spectral reflectances of the inks filled into a translucent tube in 598 to 500 nm; and FIGS. 5A, 5B and 5C, when joined at match lines A—A and B—B are measured values of the spectral reflectances of the inks filled into translucent tube in 498 to 400 nm.

BEST MODE FOR CARRYING OUT THE INVENTION

Figure 1:
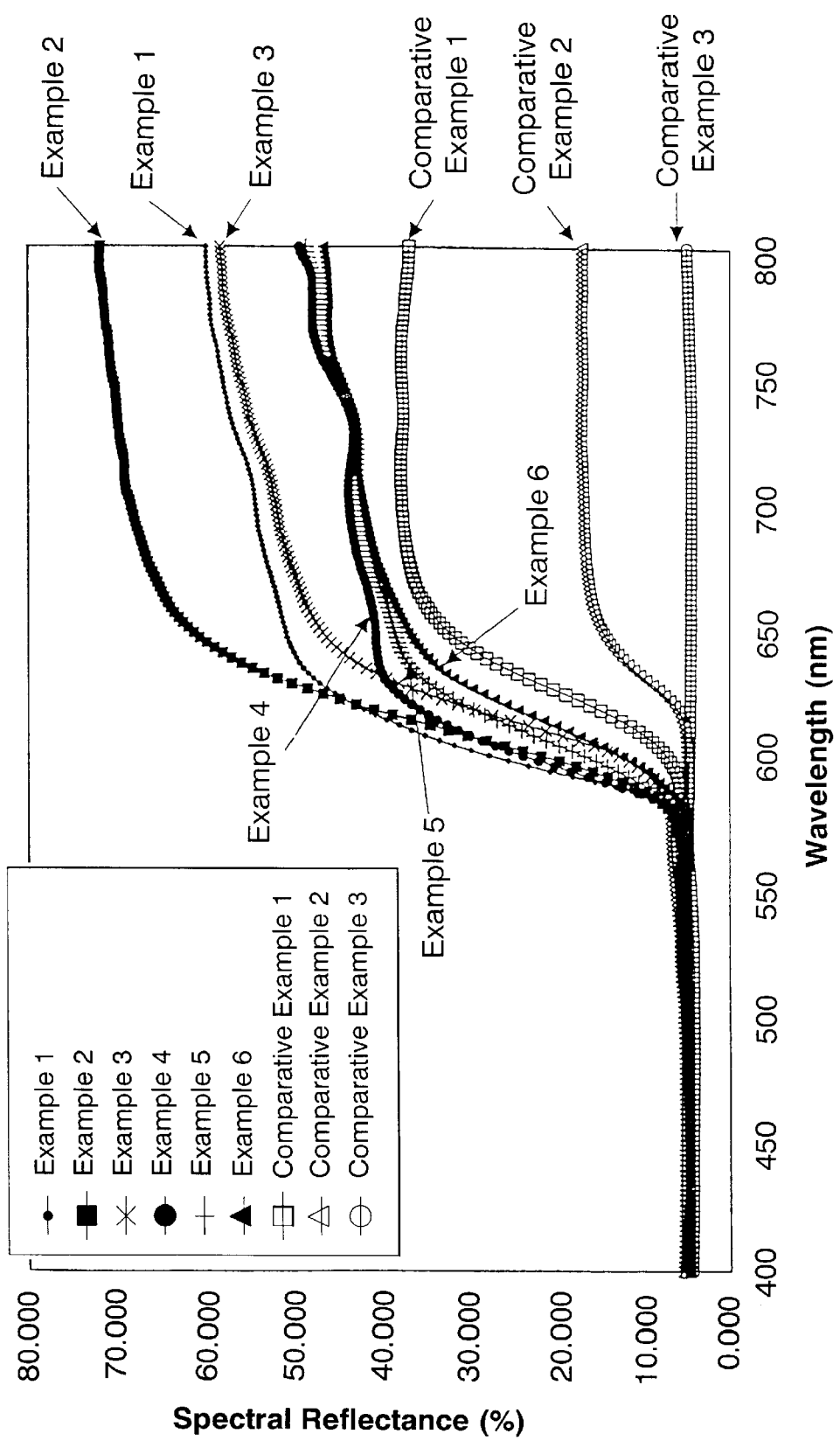
FIG. 1 is a spectral chart of a spectral reflectance of the ink filled into a translucent tube.

The embodiment of the present invention shall be explained below in detail.

The oil based red ink for a ball point pen of the present invention comprises at least one organic solvent selected from the group consisting of alcohols and glycol ethers, a resin and a colorant, wherein the spectral reflectance (%) determined in the state where the above ink for a ball point pen is filled into an ink reservoir is 20% or more at least in a longer wavelength area than 620 nm; and a spectral reflectance-rapid increase area which is the area where a difference between a spectral reflectance in the area and an average spectral reflectance in 400 to 560 nm is plus 4% or more is present between 580 to 600 nm.

The ball point pen of the present invention is characterized by charging an ink A reservoir with the oil based red ink for a ball point pen described above.

In the present invention, if the spectral reflectance is less than 20% at least in a longer wavelength area than 620 nm, a visual color of an ink reservoir filled with the oil based red ink for a ball point pen becomes dark red or black.

If the spectral reflectance-rapid increase area is present in shorter than 580 nm, that is, a shorter wavelength than 580 nm, not only a visual color of an ink reservoir filled with the ink for a ball point pen of the present invention is bluish and is not-red, but also the ink itself becomes bluish red, so that the drawn line color obtained in writing does not become red. If the spectral reflectance-rapid increase area exceeds 600 nm, a visual color of the ink reservoir filled with the above ink becomes dark red or black as is the case with the ink in which a spectral reflectance is less than 20% in a longer wavelength area than 620 nm.

Further, if a difference between the average spectral reflectance in a spectral reflectance-rapid increase area present in 580 to 600 nm and the average spectral reflectance in 400 to 560 nm is less than plus 4%, a visual color of an ink reservoir filled with the above ink does not become red, and therefore it is not preferred.

It is preferred that an ink reservoir filled with the oil based red ink for a ball point pen of the of the present invention has a hue of 4.5 to 5.5 R, a brightness of 3 or more and a saturation of 6 or more in a Munsell color system.

The spectral reflectance described above can be determined by conventional methods using various types of a spectrophotometer.

The colorant used in the present invention shall not specifically be restricted as long as the ink for a ball point pen of the present invention is colored red and includes pigments and dyes which are usually used for inks for writing instruments and coating materials.

The pigment includes inorganic pigments and organic pigments. The above pigment may be used as it is or, for example, in the form of a processed pigment or a dispersed toner prepared by subjecting it to surface treatment with a surfactant or a yellow pigment derivative in a production stage of the pigment.

All known red pigments can be used for the pigment and include, for example, C. I. Pigment-Red 17, C. I. Pigment Red 144, C. I. Pigment Red 166, C. I. Pigment Red 170, C. I. Pigment Red 177, C. I. Pigment Red 202, C. I. Pigment Red 214, C. I. Pigment Red 220 and C. I. Pigment Red 254.

Specific commercially available brand names of these pigments include, for example, Cromophtal DPP Red BO, Cromophtal DPP Red BP, Cromophtal. Red DPP, Irgazin DPP Red BO, Irgazin DPP Red BTR, Cromophtal Red A 2B, Cromophtal Red A 3B, Cromophtal Scarlet R, Cromophtal Scarlet RN,. Cromophtal Red BR, Cromophtal Red BRN, Cinquasia Magenta B-RT 343D, Cinquasia Magenta RT 235D, Cinquasia Magenta RT 343D and Cinquasia Magenta TR 235-6 (all manufactured by Ciba Specialty Chemicals Co., Ltd.), Dainichi Fast Poppy Red G and Dainichi Fast Poppy Red R (all manufactured by Dainichiseika Color & Chemicals MFG. Co., Ltd.)

The yellow pigment derivative used for subjecting the pigments described above to surface treatment includes acid type derivatives having a sulfonic acid group and base type derivatives having an amino group, and to be specific, it includes Solsperse 22000 (manufactured by Zeneca Co., Ltd.).

These red pigments may be used alone or in suitable combination of two or more kinds thereof. Among these colorants, preferably used are those containing a pigment such as C. I. Pigment Red 17, C. I. Pigment Red 170 and C. I. Pigment Red 254.

A blending amount of the red pigment is suitably selected from a range of 1 to 30% by weight, preferably 4 to 20% by weight based on the total amount of the ink for a ball point pen.

If the blending amount is less than 1% by weight, a visual color of the ink reservoir becomes dark red or black, and the drawn line color obtained in writing is different from the visual color to a large extent. Further, it can not be satisfied that a spectral reflectance at least in a longer wavelength area than 620 nm is 20% or more and that a spectral reflectance-rapid increase area which is the area where al difference between a spectral reflectance in the area and an average spectral reflectance in 400 to 560 nm is plus 4% or more is present between 580 to 600 nm. On the other hand, if it exceeds 30% by weight, the unfavorable are brought about in terms of storage stability such as a deterioration in the follow-up property with the passage of time.

The dye shall not specifically be restricted as long as it is a dye used for inks for writing instruments and for coating materials, and it may be used in combination with the pigments described above in order to control a color tone and intensity of the drawn lines.

The dye includes spirit-soluble dyes used for conventional oil based inks for a ball point pen.

The spirit-soluble dyes shall not specifically be restricted as long as they are dyes which are soluble in the organic solvents used and include, for example, Vali Fast Color (manufactured by Orient Chemical Ind. Ltd.) and Aizen Spilon dye and Aizen SOT dye (manufactured by Hodogaya Chemical Co., Ltd.).

A dispersion containing, for example, a yellow pigment and an orange pigment can be used for the ink for a ball point pen of the present invention for the purpose of toning in a range where the properties of the above ink for a ball point pen are not damaged.

All known yellow pigments can be used for the yellow pigment, and they may be those subjected to surface treatment with surfactants or yellow pigment derivatives in a production stage of the yellow pigments.

Specific examples of the yellow pigment include, for example, Pigment Yellow 1, Pigment;Yellow 12, Pigment Yellow 13, Pigment Yellow 14, Pigment Yellow 93, Pigment Yellow 94, Pigment Yellow 95, Pigment Yellow 109, Pigment Yellow 110, Pigment Yellow 128, Pigment Yellow 138, Pigment Yellow 147, Pigment Yellow 154 and Pigment Yellow 191. They may be used alone or in suitable combination of two or more kinds thereof.

The orange pigments shall not specifically be restricted as well, and any ones can be used. They may be those subjected to surface treatment with surfactants or yellow pigment derivatives in a production stage of the orange pigments.

Specific examples of the orange pigment include, for example, Mineral Orange Thiosol GL, Mineral Orange Thiosol G, Mineral Orange Solipur GH, Diacetanil Orange J1323C, Lysopac Orange 3420C, Lysopac Orange 3620C and Orange 3620L (all manufactured by Capelle Co., Ltd.), Novoperm Orange HL70 and Hostaperm Orange GR (all manufactured by Hoechst AG.), Paliogen Orange L2640, Paliogen Orange L3180DH and Palitol Orange 2370 (all manufactured by BASF AG.), Chromophtal DPP Orange TR, Chromophtal Orange 2G, Chromophtal Orange GL and Chromophtal Orange GP (all manufactured by Ciba-Geygy Co., Ltd.), Seika-fast Orange 900 (manufactured by Dai Color Italy Co., Ltd.), CHROMOFINE ORANGE 6730 and CHROMOFINE ORANGE 3700L (all manufactured by Dainichiseika Color & Chemicals MFG. Co., Ltd.). They may be used alone or in suitable combination of two or more kinds thereof.

A use amount of the dispersion shall not specifically be restricted and is 20% by weight or less, preferably less than 10% by weight based on the total amount of the ink for a ball point pen.

A dispersant may be used, if necessary, for the ink for a ball point pen of the present invention for the purpose of dispersing a pigment when using the pigment as a colorant.

The dispersant shall not specifically be restricted and is selected depending on a combination of a pigment, an organic solvent and other additives. It includes polymer dispersants and polar resins. Among them, preferably used are polymer dispersants having an amino group and resins such as polyvinyl butyral resins and ethyl cellulose resins.

Specific commercially available brand names of these dispersants include, for example, S-leck B series (manufactured by Sekisui Chemical Co., Ltd.), Denka Butyral series (manufactured by Denki-Kagaku Kogyo K.K.) and Solsperse series (manufactured by Zeneca Co., Ltd.).

With respect to a content of the dispersion, the optimum amount thereof is suitably determined.

The organic solvent used in the present invention shall not specifically be restricted as long as it is a solvent used for-conventional inks for a ball point pen and includes those which dissolve or disperse the colorants and have a relatively high boiling point.

The organic solvent is preferably at least one selected from the group consisting of alcohols and glycol ethers.

The alcohols include, for example, aromatic alcohols such as benzyl alcohol and 2-phenoxyethanol and polyhydric alcohols such as ethylene glycol, diethylene glycol, propylene glycol, dipropylene glycol, trimethylene glycol and glycerin.

The glycol ethers include, for example, diethylene glycol monomethyl ether, diethylene glycol monoethyl ether, diethylene glycol monopropyl ether, diethylene glycol monobutyl ether, dipropylene glycol monobutyl ether, tripropylene glycol monomethyl ether, tripropylene glycol monobutyl ether, propylene glycol monophenyl ether, ethylene glycol monomethyl ether, ethylene glycol monoethyl ether, ethylene glycol monopropyl ether, ethylene glycol monobutyl ether, ethylene glycol monohexyl ether, ethylene glycol mono-2-ethylhexyl ether, ethylene glycol dimethyl ether, ethylene glycol dibutyl ether, diethylene glycol dimethyl ether, diethylene glycol diethyl ether, diethylene glycol dibutyl ether, triethylene glycol dimethyl ether, tetraethylene glycol dimethyl ether, propylene glycol monomethyl ether, propylene glycol monopropyl ether, propylene glycol monobutyl ether, propylene glycol mono-t-butyl ether, dipropylene glycol monomethyl ether, triethylene glycol monobutylether, tetraethylene glycol monobutyl ether, ethylene glycol mono-2-ethylbutyl ether, propylene glycol monoethyl ether, 3-methyl-3-methoxy-1-butanol, diethylene glycol methylethyl ether, diethylene glycol monohexyl ether and diethylene glycol monoethylhexyl ether.

These organic solvents may be used alone or in suitable combination of two or more kinds thereof.

A blending amount of the organic solvent is suitably selected from a range of 20 to 70% by weight, preferably 40 to 70% by weight based on the total amount of the ink for a ball point pen of the present invention.

If the blending amount is less than 20% by weight, the colorant and the other components added are poor in solubility, and therefore such an amount is not preferred. On the other hand, if it exceeds 70% by weight, the colorant added is relatively short, and the concentration is reduced. Accordingly, such an amount is not preferred as well.

The resin used in the present invention is used in order to control a viscosity of the ink and shall not specifically be restricted as long as it is a resin used for conventional inks for a ball point pen. It includes, for example, ketone resins, sulfonamide resins, rhaleic resins, ester gums, xylene resins, alkyd resins, phenol resins, rosin resins, polyvinylpyrrolidone, polyvinylbutyral resins and modified products thereof.

These resins may be used alone or in suitable combination of two or more kinds thereof.

A content of the resin is suitably selected from a range of 5 to 30% by weight, preferably 5 to 25% by weight based on the total amount of the ink for a ball point pen of the present invention.

If the content is less than 5% by weight, the minimum viscosity required for the ink is not obtained, and therefore it is not preferred from such point of view. On the other hand, if it exceeds 30% by weight, the viscosity of the resulting ink becomes too high, and therefore it is not preferred as well from such point of view.

With respect to a viscosity of the ink for a ball point pen of the present invention, the usable viscosity at 25° C. falls in a wide range of 20,000 mPa·s or less, preferably 10 to 10,000 mPa·s, and the viscosity is preferably controlled suitably by such blending amounts of the resin and the organic solvent as described above depending on the case where the colorant is a dye and/or a pigment.

Other components may be added, if necessary, to the. ink for a ball point pen of the present invention as long as the properties of the ink for a ball point pen of the present invention are not damaged. The components which can be added may be any ones as long as they are usually used for inks for a ball point pen and include, for example, fatty acids, surfactants, rust preventives, antioxidants, fungicides, pH controllers and lubricants.

The ink for a ball point pen of the present invention can be produced by various methods which have so far been known.

It can readily be obtained, for example, by blending the respective components described above and mixing and stirring them by means of a stirrer such as a dissolver or mixing and pulverizing them by means of a ball mill, a three roll mill, a bead mill or sand mill and removing coarse particles of the pigments, undissolved substances and admixed solids by means of centrifugation or filtration.

The ink for a ball point pen of the present invention thus obtained can be recognized as a red color and is used as a red ink for a ball point pen.

The ink for the ball point pen of the present invention is preferably used as an oil based ink for a ball point pen. Further, the ink for a ball point pen of the present invention can be used for a ball point pen, etc.

An ink reservoir used in the present invention shall not specifically be restricted as long as at least a part of the ink reservoir transmits light, and uncolored and transparent or translucent one may be usable.

Materials for the ink reservoir include uncolored and transparent or translucent plastics, and any ones can be used as long as they are usually used for ball point pens. Specific examples thereof include, for example, thermoplastic resins such as-polypropylene, polyethylene, polyacrylonitrile base thermoplastic resins, polyethylene terephthalate, polyarylate and ethylene-vinyl alcohol copolymers. In particular, polypropylene is inexpensive and has transparency and suitable strength and hardness, and therefore it is suited.

In the ball point pen of the present invention, used is an ink reservoir charged with the oil based red ink for a ball point pen of the present invention described above.

In the ball point pen of the present invention, used is a barrel of the ball point pen in which an ink reservoir is put and at least a part of which transmits light.

EXAMPLES

The present invention shall be explained below in further details with reference to examples and comparative examples, but the present invention shall by no means be restricted by the examples.

The ink for a ball point pen was produced in the following manner.

First, when a pigment was used as the colorant, the pigment was dispersed by a conventional method, that is, by means of a ball mill or a three roll mill.

Next, a vessel equipped with a reflux condenser and a stirrer was charged with the respective components and stirred at 60° C. for 10 hours, and then impurities were removed by pressure filtration to obtain an intended ink for a ball point pen.

The manufacturer of the blended components used in the following examples and comparative examples are shown below.
1) manufactured by Zeneca Co., Ltd.
2) manufactured by Hitachi Chemical Co., Ltd.
3) manufactured by ISP Co., Ltd.
4) manufactured by Hodogaya Chemical Co., Ltd.
5) manufactured by Sekisui Chemical Co., Ltd.
6) manufactured by Huelsu AG.
7) manufactured by BASF AG.

Example 1

The following components were blended to prepare a red ink for a ball point pen.

| Pigment: | C. I. Pigment Red 254 | 10 wt % |
|---|---|---|
| Dispersant: | Solsperse 22000[1] | 1.6 wt % |
| | Solsperse 24000[1] | 7 wt % |
| Solvent: | benzyl alcohol | 6.4 wt % |
| | 2-phenoxyethanol | 45 wt % |
| Resin: | acetophenone resin (Hilac 110H)[2] | 24.5 wt % |
| | polyvinylpyrrolidone (PVPK90)[3] | 0.5 wt % |
| Lubricant: | oleic acid | 5 wt % |

Example 2

The following components were blended to prepare a red ink for a ball point pen.

| Pigment: | C. I. Pigment Red 170 | 15 wt % |
|---|---|---|
| Dispersant: | Solsperse 24000[1] | 5 wt % |
| Solvent: | benzyl alcohol | 15 wt % |
| | 2-phenoxyethanol | 37 wt % |
| Resin: | acetophenone resin (Hilac 110H)[2] | 24.5 wt % |
| | polyvinylpyrrolidone (PVPK90)[3] | 0.5 wt % |
| Lubricant: | oleic acid | 3 wt % |

Example 3

The following components were blended to prepare a red ink for a ball point pen.

| Pigment: | C. I. Pigment Red 254 | 10 wt % |
|---|---|---|
| Dispersant: | Solsperse 22000[1] | 0.8 wt % |
| | Solsperse 24000[1] | 3.5 wt % |
| Dye: | Spilon Red C-BH[4] | 10 wt % |
| Solvent: | benzyl alcohol | 14.2 wt % |
| | 2-phenoxyethanol | 46 wt % |
| Resin: | polyvinylpyrrolidone (PVPK30)[3] | 10 wt % |
| | polyvinylpyrrolidone (PVPK90)[3] | 0.5 wt % |
| Lubricant: | oleic acid | 5 wt % |

Example 4

The following components were blended to prepare a red ink for a ball point pen.

| Pigment: | C. I. Pigment Red 254 | 10 wt % |
|---|---|---|
| Dispersant: | polyvinylbutyral (S-leck B BL-1)[5] | 2 wt % |
| Dye | Spilon Red C-GH[4] | 10 wt % |
| | Spilon Yellow C-GNH[4] | 5 wt % |
| Solvent: | benzyl alcohol | 11.3 wt % |
| | 2-phenoxyethanol | 45.2 wt % |
| Resin: | acetophenone resin (Resin SK)[6] | 16 wt % |
| | polyvinylpyrrolidone (Luviscoll K80)[7] | 0.5 wt % |

Example 5

A red ink for a ball point pen was prepared in the same manner as in Example 4, except that the blending amounts of C. I. Pigment Red 254 and polyvinylbutyral (S-leck B BL-1) were changed to 5 wt % and 1 wt % respectively.

Example 6

A red ink for a ball point pen was prepared in the same manner as in Example 4, except that the blending amounts of C. I. Pigment Red 254 and polyvinylbutyral (S-leck B BL-1) were changed to 2 wt % and 0.5 wt % respectively.

Comparative Example 1

A red ink for a ball point pen was prepared in the same manner as in Example 4, except that the blending amounts of C. I. Pigment Red 254 and polyvinylbutyral (S-leck B BL-1) were changed to 0.5 wt % and 0.2 wt % respectively.

Comparative Example 2

The following components were blended to prepare a red ink for a ball point pen.

| Dye: | Spilon Red C-GH[4] | 10 wt % |
| --- | --- | --- |
| | Spilon Yellow C-GNH[4] | 5 wt % |
| Solvent: | benzyl alcohol | 20 wt % |
| | 2-phenoxyethanol | 45.2 wt % |
| Resin: | acetophenone resin (Resin SK)[6] | 16 wt % |
| | polyvinylpyrrolidone (Luviscoll K80)[7] | 0.8 wt % |
| Lubricant: | oleic acid | 3 wt % |

Comparative Example 3

The following components were blended to prepare a red ink for a ball point pen.

| Dye: | SPT Orange #6[4] | 15 wt % |
| --- | --- | --- |
| | Spilon Red C-GH[4] | 5 wt % |
| | Spilon Yellow C-2GH[4] | 3 wt % |
| Solvent: | benzyl alcohol | 13.2 wt % |
| | 2-phenoxyethanol | 40 wt % |
| Resin: | acetophenone resin (Hilac 110H)[2] | 20 wt % |
| | Polyvinylpyrrolidone (Luviscoll K80)[7] | 0.8 wt % |
| Lubricant: | oleic acid | 3 wt % |

Evaluation Test 1

The red inks for a ball point pen prepared in Examples 1 to 6 and Comparative Examples 1 to 3 were charged respectively into a thin translucent tube which was made of polypropylene and had an outer diameter of 3 mm and an inner diameter of 1.6 mm as an ink reservoir. Next, the resulting translucent tubes charged with the above inks were used to determine a spectral reflectance under the following conditions by means of spectrophotometer U3300 equipped with a 150 φ integrating sphere for U3300 (manufactured by Hitachi Ltd.). The eight sample tubes were loaded parallel in a bundle in order to be equipped closely to the measuring window of 20 mm φ of the integrating sphere. Shown in Table 1 are the average spectral reflectances in 400 to 560 nm, the spectral reflectance-rapid increase areas and the reflectances in 620 nm; the spectra are shown in FIG. 1; and the measured values of the average spectral reflectances are shown in FIG. 2 to FIG. 5.

Measuring conditions:

Data mode: % T

Scanning speed: 600 nm/min.

Wavelength range: 800.00 to 400.00 nm

Slit: 5.0 nm

Base line calibration: aluminum oxide-plate

Sampling interval: 2 nm

Subsidiary white plate: aluminum oxide plate

TABLE 1

| | Example | | | | | | Comparative Example | | |
| --- | --- | --- | --- | --- | --- | --- | --- | --- | --- |
| | 1 | 2 | 3 | 4 | 5 | 6 | 1 | 2 | 3 |
| Average spectral reflectance (%) in 400 to 560 nm | 4.675 | 4.845 | 5.280 | 4.714 | 5.155 | 4.900 | 5.001 | 4.882 | 4.198 |
| Spectral reflectance-rapid increase area (nm) | 584–586 | 586–588 | 594–596 | 584–586 | 588–590 | 594–596 | 608–610 | 628–630 | None |
| Spectral reflectance (%) in 620 nm | 41.721 | 40.540 | 29.035 | 35.299 | 29.136 | 24.087 | 14.742 | 5.910 | 4.491 |

Evaluation Test 2

The translucent tubes charged with the inks obtained in the evaluation test 1 were subjected to the following evaluation test carried out by 20 monitors. The results thereof are shown in the following Table 2.

(1) Visual Color Test

The translucent tubes charged with the inks were subjected to an identification test of a visual color under a D65 standard light source F65D-A type (manufactured by Suga Test Instruments Co., Ltd.).

(2) Drawn Line Color Test

The translucent tube charged with the ink was set in a barrel of a ball point pen, and the resulting ball point pen was used to write on PPC paper (copying paper) to evaluate whether the drawn line color was approximate to the visual color.

TABLE 2

| | Reply to visual color | | | | Reply to comparison of drawn line color with visual color | | |
|---|---|---|---|---|---|---|---|
| | Red | Black | Dark red | Unknown | Same | Very close | Different |
| Example 1 | 20 | 0 | 0 | 0 | 19 | 1 | 0 |
| Example 2 | 20 | 0 | 0 | 0 | 18 | 2 | 0 |
| Example 3 | 20 | 0 | 0 | 0 | 18 | 2 | 0 |
| Example 4 | 19 | 0 | 0 | 1 | 20 | 0 | 0 |
| Example 5 | 19 | 0 | 0 | 1 | 20 | 0 | 0 |
| Example 6 | 17 | 0 | 0 | 3 | 15 | 3 | 2 |
| Comparative Example 1 | 7 | 0 | 13 | 0 | 0 | 2 | 18 |
| Comparative Example 2 | 0 | 1 | 18 | 1 | 0 | 0 | 20 |
| Comparative Example 3 | 0 | 20 | 0 | 0 | 0 | 0 | 20 |

*Number in the table shows the number of persons

Evaluation Test 3

The Munsell color was determined from the visual color of the translucent tube charged with the ink obtained in the evaluation test 1. The results thereof are shown in the following Table 3.

TABLE 3

Munsell color of visual color of ink reservoir

| | Hue H | Brightness V | Saturation C |
|---|---|---|---|
| Example 1 | 5.55 R | 3.52 | 9.03 |
| Example 2 | 5.59 R | 3.88 | 10.92 |
| Example 3 | 4.50 R | 3.36 | 8.42 |
| Example 4 | 5.73 R | 3.65 | 9.88 |
| Example 5 | 5.14 R | 3.44 | 8.24 |
| Example 6 | 4.65 R | 3.33 | 7.18 |
| Comparative Example 1 | 4.00 R | 2.97 | 5.31 |
| Comparative Example 2 | 5.56 R | 2.52 | 1.02 |
| Comparative Example 3 | 1.26 YR | 2.43 | 0.40 |

Consideration to Table 1, Table 2, Table 3, FIG. 1 and FIG. 2 to FIG. 5

As apparent from the results shown above, it can be found that since the inks for a ball point pen of the present invention obtained in Examples 1 to 6 fall in the scope of the present invention, they can be identified from the appearance of the ink reservoirs charged with the above inks for a ball point pen as being red inks and that the drawn line colors were same as or very close to the visual colors so as to be approximate. In contrast with this, since the inks for a ball point pen obtained in Comparative Examples 1 and 2 fall outside the scope of the present invention, colors observed from the appearance of the ink reservoirs are dark red. Therefore, though it can be found that the red inks are charged therein, they are deviated from the drawn line colors to a large extent. As a result, the visual colors were evaluated to be different from the drawn line colors to a large extent. The ink for a ball point pen obtained in Comparative Example 3 has the visual color close to a black color, and therefore it can not be identified what color ink is charged therein.

In view of the foregoing, it can be found that the oil based red inks for a ball point pen of the present invention are apparently excellent.

Industrial Applicability

The present invention provides an ink for a ball point pen the color of which can be identified from a visual color of an ink reservoir and the visual color of which is close to that of the drawn lines. A ball point pen in which the drawn line color can be identified from the appearance of the ink reservoir can be obtained by filling the ink in a ball point pen in which a part of a barrel loading the ink reservoir can transmit light.

What is claimed is:

1. An oil based red ink for a ball point pen comprising at least one organic solvent selected from the group consisting of alcohols and glycol ethers, a resin and a colorant, wherein the spectral reflectance (%) determined in the state where said ink is filled into an ink reservoir is 20% or more at least in a longer wavelength area than 620 nm; and a spectral reflectance-rapid increase area which is the area where a difference between a spectral reflectance in the area and an average spectral reflectance in 400 to 560 nm is plus 4% or more is present between 580 to 600 nm.

2. The oil based red ink for a ball point pen as described in claim 1, wherein a pigment and a dye are used in combination as the colorant.

3. The oil based red ink for a ball point pen as described in claim 1, wherein the colorant comprises at least one selected from the group consisting of C. I. Pigment Red 17, C. I. Pigment Red 170 and C. I. Pigment Red 254.

4. A ball point pen characterized by charging an ink reservoir with the oil based red ink for a ball point pen as described in claim 3.

5. A ball point pen characterized by charging an ink reservoir with the oil based red ink for a ball point pen as described in claim 1.

6. The ball point pen as described in claim 5, wherein at least a part of the ink reservoir is composed of uncolored and transparent or translucent polypropylene.

7. The ball point pen as described in claim 6, wherein at least a part of a barrel of the ball point pen loading the ink reservoir transmits light.

8. The ball point pen as described in claim 5, wherein at least a part of a barrel of the ball point pen loading the ink reservoir transmits light.

9. A ball point pen in which a visual color of an ink reservoir has a hue of 4.5 to 5.5R, a brightness of 3 or more and a saturation of 6 or more in a Munsell color system in the state where an ink reservoir is charged with an oil based red ink for a ball point pen comprising at least one organic solvent selected from the group consisting of alcohols and glycol ethers, a resin and a colorant.

10. The ball point pen as described in claim 9, wherein at least a part of a barrel of the ball point pen loading the ink reservoir transmits light.

* * * * *